UNITED STATES PATENT OFFICE.

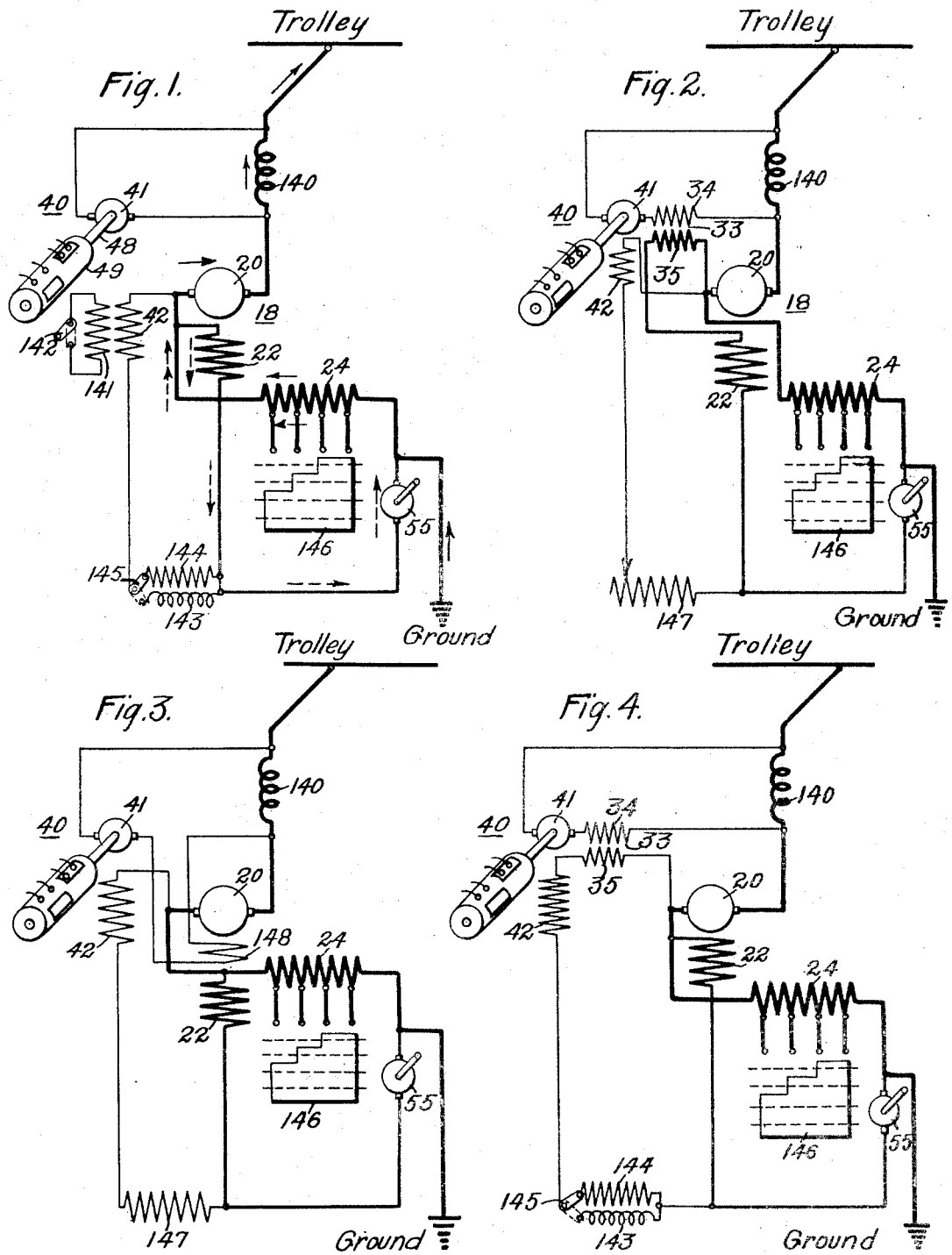

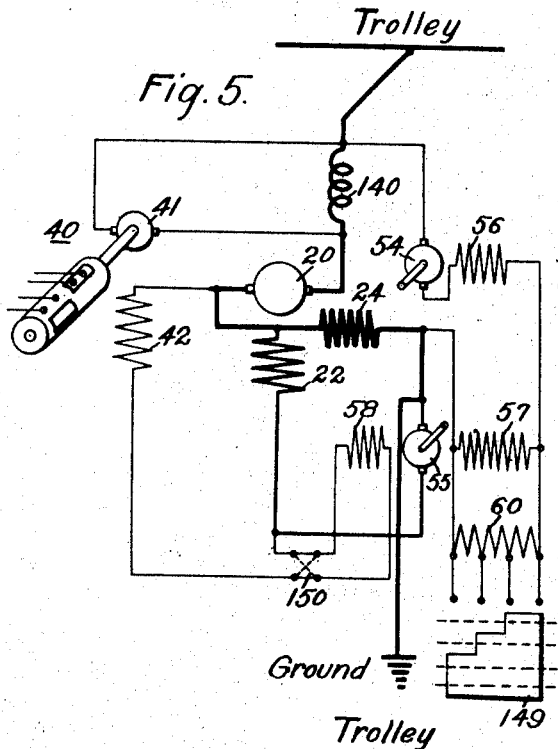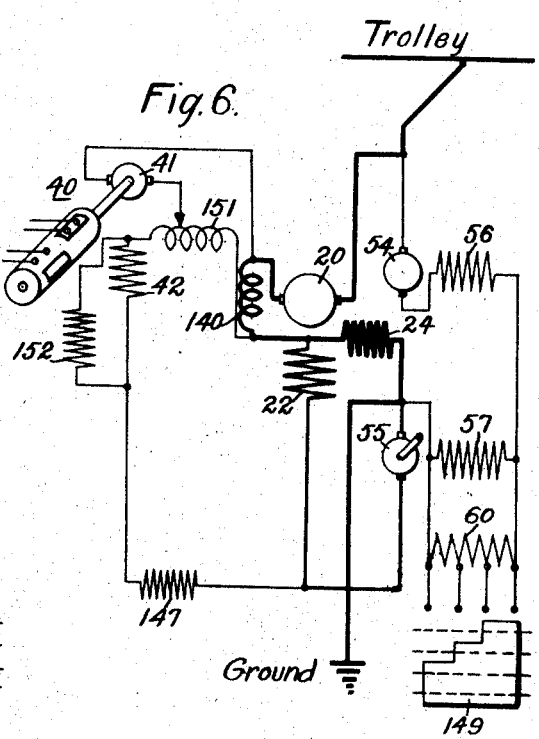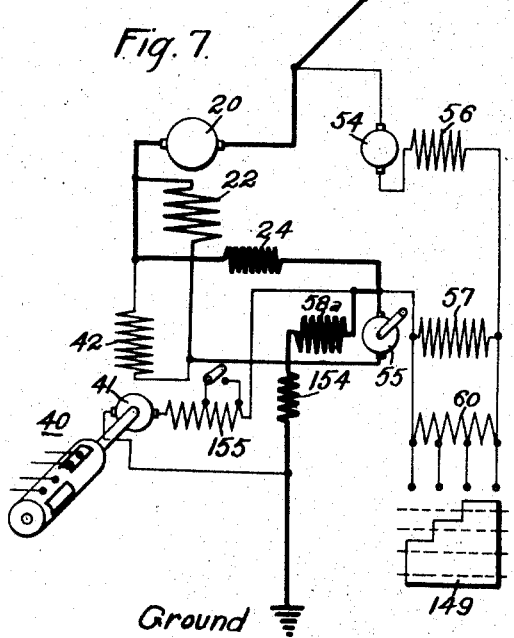

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,417,733.　　　　Specification of Letters Patent.　　Patented May 30, 1922.

Application filed May 7, 1919. Serial No. 295,265.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Systems of Control, of which the following is a specification.

My invention relates to systems of control for dynamo-electric machines and particularly to certain automatic control features for accelerating and regenerative operation of electric railway motors and the like.

The object of my invention, in general, is to provide a more reliable and advantageous system of regenerative control in various aspects than has been proposed heretofore.

Specifically considered, one object of the invention is to provide, in conjunction with an automatic control system, a motor-type relay device having a time-element of operation smaller than that of the main machine, whereby undesirable over-regulation of certain motor circuits is reliably prevented.

Another specific object of my invention is to provide a novel auxiliary control system for effecting automatic transition of a plurality of electric motors from parallel to series relation, or vice versa.

Other minor objects and advantages of the present invention will become evident from the following detailed description, taken in conjunction with the accompanying drawings, wherein—

Figure 1 to Fig. 7, inclusive, are simplified diagrammatic views of various modifications embodying the principles of my present invention.

Figure 8:
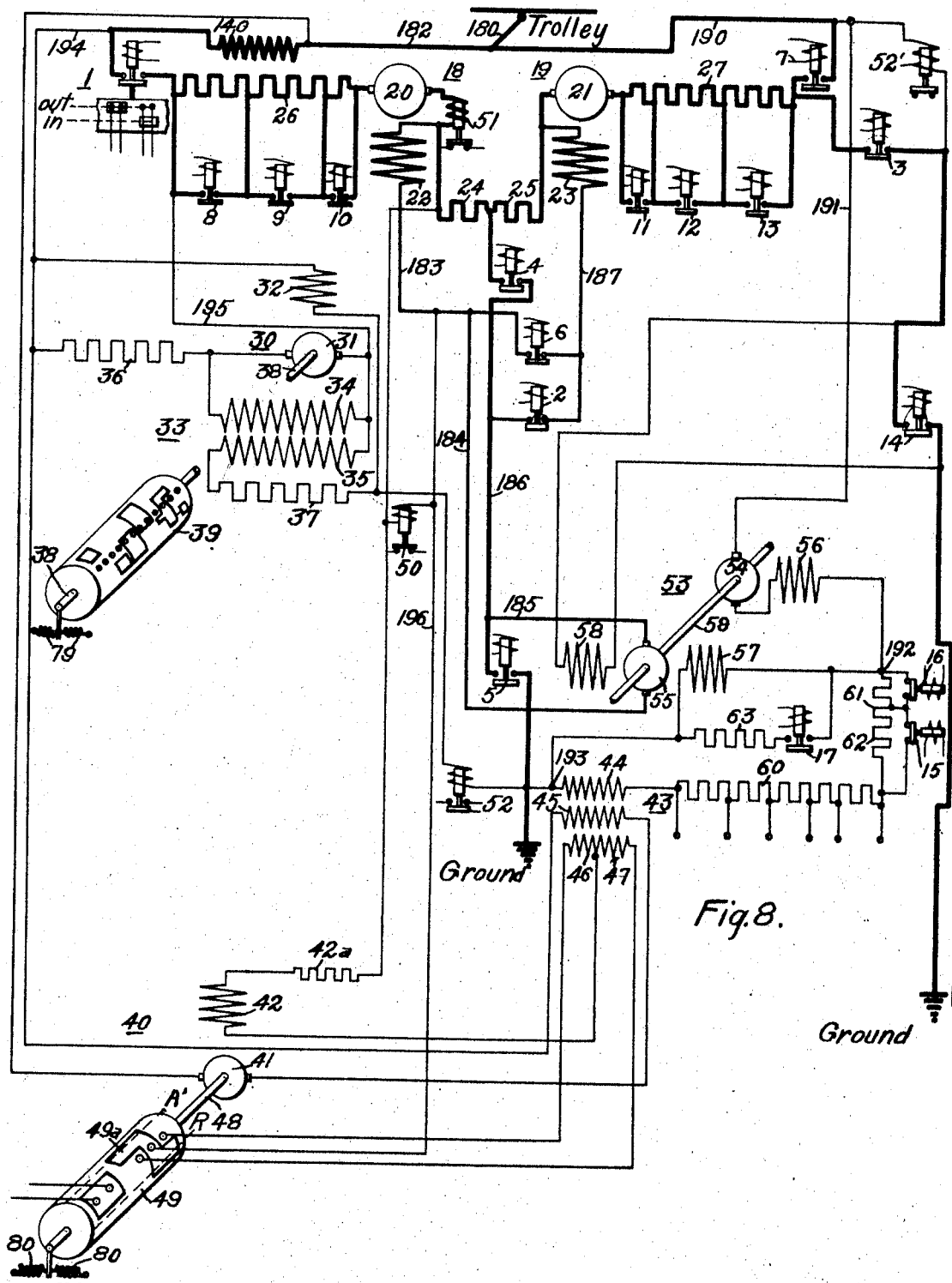
Fig. 8 is a diagrammatic view of the complete main circuits of the preferred form of the invention.

Figs. 10 to 15, inclusive, are simplified diagrammatic views illustrating one feature of my invention.

In connection with the automatic control of direct-current railway motors, and the like, during the regenerative period, difficulty has been experienced in obtaining precise control of the system by reason of the fact that, with the customarily employed separately-excited main machines, the field windings respond very sluggishly to current regulation, since the magnetic circuits thereof, including the motor frame, are composed of solid magnetizable material, in which eddy currents are created. Consequently, the current relay or limit switch that is ordinarily utilized for governing the automatic control of the system does not move quickly enough to prevent the regulating apparatus from taking several steps or notches at a time instead of the desired single step.

It has previously been suggested, as a remedy for this condition, to connect the armature of a motor-type relay that governs the circuit regulation across an impedance or inductive device that is traversed by the main-machine current. However, this suggestion has not proved efficacious in all instances and, in the present invention, therefore, the relay action is temporarily influenced during the active control operation by changes in the field excitation of the main machine or of the exciter so that the initial change of circuit conditions affects the relay in advance proportionately to the final current condition that corresponds to such change.

Another difficulty encountered in previous regenerative-control equipments relates to the connection of the machines to the supply circuit, after a coasting or free-running period, by balancing the machine voltage against the line voltage. In many instances, such regulation resulted in a period of practically zero line current after closing the switch that connects the machine to the supply circuit, since a certain time element is required to actuate the control apparatus that regulates the voltage of the momentum-driven machine. In order instances, the above-mentioned sluggishness of the field winding caused field-excitation changes in the wrong direction after the line switch was closed, whereby motoring current was first obtained when regenerative current was intended, or vice versa. Evidently, such conditions materially increase the time element between the initial movement of the master controller and obtaining the desired operating result. The present invention is, therefore, also intended to obviate the difficulties just recited.

Still another difficulty was experienced with some of the prior regenerative-control systems by reason of the fact that the speed-current characteristic curve corresponding to the last series step or notch of the machines, was steeper than the curve corresponding to the first parallel step. If the two curves mentioned intersect in the area corresponding to motoring operation so that the last series curve is higher at no load than the first parallel curve, then regeneration will be temporarily obtained when motoring operation is desired, if the change-over is effected at or near the no-load condition. However, if, on the other hand, the curves in question cross in the area corresponding to regeneration, the last series curve is located considerably below the first parallel curve during motoring operation, thereby necessitating that the motors run with resistance inserted in circuit for an undue length of time, entailing excessive losses. To avoid the two undesirable conditions mentioned, the last series curve should be approximately parallel to the first multiple curve, at least for motoring operation. This result may be accomplished either by flattening the last series curve, steepening the first parallel curve or by doing both. The present invention is adapted to effect the desired regulation and thus eliminate the corresponding troubles in the prior art.

Referring to Fig. 1 of the drawings, the system shown comprises suitable supply-circuit conductors Trolley and Ground; a main dynamo-electric machine 18 having a commutator-type armature 20 and a field winding 22 of the heavy-coil series type; a balancing or stabilizing resistor 24; an auxiliary generator or exciter 55 for the main field winding; a torque-motor-relay device 40 for regulating the voltage of the momentum-driven main machine, in this case, by varying the active circuit value of the stabilizing resistor 24; an impedance or inductive device 140 that is traversed by the main-machine current and is connected to the torque-motor relay device 40 in a manner to be set forth; and a plurality of auxiliary-circuit translating devices, namely, a resistor 144 and an inductive device 143 that are alternatively connected in circuit by a switch 145, under conditions to be set forth.

The torque-motor-relay device 40 comprises a commutator-type armature 41 that is connected across the main-circuit inductive device 140; an exciting field winding 42 that is connected through either the resistor 144 or the inductive device 143 to the terminals of the main field winding 22; and a damping field winding 141 which may be connected in circuit by closing a switch 142, during the motoring period, to produce a relatively large time element of operation.

Upon the operating shaft 48 of the torque-relay armature 41, a small drum or cylinder 49 is mounted and carries any desired number and arrangement of contact segments for co-operating with a plurality of control fingers to thus regulate certain auxiliary control circuits in accordance with the position or deflection of the relay device. In the present instance, the relay is preferably adapted to govern the action of the controller 146, as fully illustrated and described in connection with Fig. 8, whereby the desired precise regulation of the main-machine circuit is automatically effected through the agency of the illustrated torque-motor relay.

The main-armature or load circuit during the regenerative period is indicated by the solid arrows and may be traced from the supply conductor Ground through the stabilizing resistor 24, main armature 20, inductive device 140 and thence to the other supply conductor Trolley. The main field winding or exciting circuit is indicated by the dotted arrows and is established from the positive terminal of the exciter armature 55, through the stabilizing resistor 24 in the same direction as that taken by the load current, and thence, through the exciting field winding 22, to the negative terminal of the exciter armature 55. Such connections are not of my present invention, but are fully described in my application, Serial No. 44,443, filed August 9, 1915, patented April 1, 1919, No. 1,298,706. It will be understood that my relay device and auxiliary circuits may be employed with any suitable type of main regenerative circuits and, therefore, further detailed description of such main circuits is not deemed to be necessary here.

The resistor 144 is connected in circuit with the relay field winding 42 during regenerative operation. This resistor, together with the small damping constant of the relay field winding, imparts thereto a much smaller time-constant than that of the main field winding. Assuming that a control step is being taken during regenerative control, by actuating the controller 146 to short-circuit a portion of the stabilizing resistor 24, an increased main field strength and, consequently, increased regenerative current will be obtained. However, certain delays will be caused in such changes by reason of the damping and self-inductive effects of the various circuit elements, particularly of the main field winding 22. On the other hand, an increase in the main field current will produce a correspondingly augmented transient field voltage which will be impressed upon the field-winding circuit of the relay device. Since the relay circuit has a small time-constant, the change in its flux is produced at once, whereby the armature of the relay device is deflected to prevent more than one control step from being taken.

If the torque relay 40 is employed during acceleration also, the previously described actions may not produce proper results. Assuming, for instance, that the main motor is being accelerated by weakening the field strength through the agency of the controller 146, a transient low field voltage will be obtained. Since the time-element of the relay field circuit is small, under the conditions previously described, this low voltage will reduce the field strength of the relay, which prevents it from being deflected quickly enough and thus permits an additional step of the controller 146 before stable excitation conditions in the main machine are attained. Consequently, under accelerating conditions, it is desirable to provide the relay field circuit with a time-element that is slower than that of the main-machine field winding. For this purpose, the inductive device 143 is employed during acceleration instead of the resistor 144, as indicated by the dotted-line position of the switch 145, and, also, the damping field winding 141 is utilized, as likewise indicated by the dotted-line position of the switch 142. Such circuit connections will, therefore, provide the desired results during acceleration.

By employing the different sets of connections that are shown in Fig. 1, therefore, the torque-relay device 40 may be effectively and desirably employed during both the regenerative and the accelerating periods of the main machine. As previously mentioned, the provision of the main-circuit impedance 140 makes for rapid response of the relay to changes in circuit conditions.

Referring to Fig. 2, the main machine, the exciter and the stabilizing resistor are employed as already described in connection with Fig. 1, while the torque motor 40 is provided with the single exciting field winding 42 and, therefore, is primarily adapted for use during regenerative control. A small transformer 33 has its primary winding 35 connected in series relation with the main field winding 22, while the secondary winding 34 of the transformer is connected in series relation with the armature 41 of the relay across the main-circuit inductive device 140. A variable resistor 147 is connected in series relation with the relay exciting field winding 42 across the circuit comprising the main field winding 22 and the primary transformer winding 35.

The system under consideration, instead of effecting only the relay field circuit by the changes taking place in the main field winding, influences the relay armature circuit as well. The resistor 147 serves the same purpose as the resistor 144 of Fig. 1, while the small transformer 33 accomplishes the desired additional purpose. Whenever a portion of the stabilizing resistor 24 is short-circuited by the controller 146, a certain increased current will flow through the primary transformer winding 35 which, in turn, increases the total flux of the transformer. Such action induces a voltage in the secondary transformer winding 34 that is adapted to increase the current traversing the relay armature 41, thus bringing about the deflection thereof somewhat previous to the increase of regenerative current to prevent the control apparatus from taking more than the desired single operating step.

Referring to Fig. 3, the same result is accomplished by connecting a separate field coil 148, constituting a portion of the exciting field winding, in series relation with the armature 41 of the torque relay device 40. This additional field coil is substituted for the small transformer 33 of Fig. 2. The operation of the system may be briefly set forth as follows:

Upon an increase in the current traversing the main exciting field coil 22, by reason of a short-circuit of a portion of the stabilizing resistor 24, an increased voltage is induced in the additional field coil 148, whereby an increased current flows through the relay armature 41 previously to the actual change in the main-armature current, and thus the controller 146 is prevented from moving more than one notch.

In Fig. 4, the desired regulation is obtained by connecting the primary winding 35 of the transformer 33 in series relation with the exciting field winding 42 for the relay device. The secondary transformer winding 34 is again connected in circuit with the relay armature 41, as in Fig. 2. Furthermore, the resistor 144 and the inductive device 143 are again utilized during the regenerative and the accelerating periods, as previously described in connection with Fig. 1. Preferably the damping field winding 141 for the relay device 40 is also employed in the system that is shown in Fig. 4 for the same purpose as that set forth in connection with Fig. 1.

By connecting the transformer 33 in the manner shown in Fig. 4, the current traversing the relay armature 41 in all cases causes the relay device to be actuated in the proper direction. Assuming regenerative operation, for example, and that a control step is being taken, producing an increase in field voltage, then such increase raises the current value in the primary transformer winding 35 and the voltage of the relay armature 41 whenever regenerative current is flowing through the inductive device 140. While accelerating and taking a control step that gives decreased field voltage, the electromotive force induced in the secondary transformer winding 34 will be in the opposite direction. However, the accelerating current traversing the inductive device 140, and, therefore, the normal current in the relay armature 41, is also in the opposite direction, so that the voltage induced in the secondary transformer winding 34 again effects the desired movement of the relay device, the deflection thereof being in the reverse direction from that taken during regenerative operation.

Whenever the control system is arranged to manipulate the excitation of a field winding of the exciter machine, additional time-elements or delays are necessarily introduced between the actual taking of a control step and the resultant changes in the main-field-winding and armature currents. In such cases, therefore, it is desirable to influence the action of the relay device directly by the changes that take place in the exciter field current. In Fig. 5, the desired result is accomplished by an additional field winding 58 for the exciter 55, such winding being connected in series relation with the relay-device field winding 42 across the main exciting field winding 22. To obtain proper functioning of the exciter during both regeneration and motoring, a reversing switch 150 for the additional field winding 58 is provided. However, if the field winding 58 is connected in series relation with the relay armature 41, the reversing switch 150 may be omitted.

In the present system, a resistor 60 is connected across the chief exciting field winding 57 for the exciter 55 and a controller 149 is governed by the torque relay device 40, to regulate the active circuit value of the resistor 60, thus, in turn, varying the exciter voltage and the main-armature voltage. Furthermore, an auxiliary driving motor 54 for the exciter machine is provided with an exciting field winding 56, which is connected in series relation with the armature 54 and the field winding 57 for the exciter across the supply-circuit conductors.

Fig. 6 discloses an arrangement permitting the use of an auto-transformer 151 in place of the two-coil transformer 33 that was shown in previous figures. The auto-transformer winding is connected in series relation with the exciting field winding 42 for the torque relay device and the resistor 147 across the terminals of the main exciting field winding 22, while the relay armature 41 is connected across the main-circuit inductive device 140 through a variable portion of the auto-transformer winding 151. The resistor or inductive device 147 and a resistor 152, which is connected across the exciting field winding 42 for the relay device, are adjusted to produce the proper amount of damping and self-inductive effects in the relay field circuit. It is assumed, in the present instance, that the time-element of that circuit is either the same as, or slower than, that of the main field winding, and that the voltage added in the relay armature circuit by the auto-transformer winding 151 is inherently adapted to deflect the relay device in the proper direction after the initiation of a control step, whereby further undesired control operations are prevented.

In Fig. 7, a field winding 58a is provided for the exciter armature 55, in addition to the field winding 57, and is connected in series relation with the main armature 20. In other words, the field winding 58a is energized in accordance with the load or regenerative current of the system. The relay armature 41 is connected, through a variable resistor 155 and a permanent resistor 154, across the load-excited field winding 58a, while the relay exciting field winding 42 is connected in direct parallel relation with the exciting field winding 22. During stable operating conditions, the ohmic drop across the field winding 58a, increased, if necessary, by the use of the series-connected resistor 154, supplies the normal voltage to the relay armature 41 and maintains the relay device in its intermediate normal position. Whenever the current traversing the exciter field winding 58a changes, however, a corresponding transient or inductive voltage is added to the above-mentioned ohmic drop. Consequently, the current flowing through the relay armature 41 is varied in such manner as to produce the desired deflection of the relay device and thus prevent undesirable control operation, viz, the movement of the controller 149 through more than one step at a time.

If a plurality of main motors are employed and series-parallel operation thereof is desired, the illustrated resistor 155 may be introduced into the relay armature circuit during parallel motor operation, to compensate for the increased current in the load-excited field winding 58a for the exciter machine, whereby the same values of current and voltage are supplied to the relay armature itself.

Referring to Fig. 8, the system shown comprises the supply-circuit conductors, Trolley and Ground; a plurality of main dynamo-electric machines 18 and 19, respectively having armatures 20 and 21 and field windings 22 and 23; a plurality of stabilizing resistors 24 and 25 and of accelerating resistors 26 and 27 for the respective machines; an auxiliary motor-generator set 53, or the like, for supplying energy to the main field windings; a torque-motor-relay device 30, the transformer 33, and the main-circuit inductive device 140, as previously described; the torque - motor - relay device 40 which, as hereinbefore mentioned, is employed for the purpose of effecting automatic control of the system after the line switches are closed, the relay device 40 acting in conjunction with an auxiliary transformer 43 that is energized in accordance with the driving-motor current of the motor-generator set 53. For further purposes of control, a plurality of switches, 1 to 17 inclusive, are connected in various circuits to be described, and a plurality of solenoid-type relay devices 50, 51 and 52, are also utilized for certain automatic control operations.

As described in detail in connection with Fig. 9, the torque-motor relay device 30 governs the main machine voltage before the line switches are closed, that is to say, during the coasting operation of the vehicle. Under stable conditions, while the line switch 1 is open, the relay device 30 will produce no torque when the line and the machine voltages are balanced or approximately equal, since the relay armature 31 is connected, through the resistor 36, across the line switch 1. However, when the two voltages differ by a predetermined amount, torque in the one or the other direction will be produced in the relay device 30, causing it to rotate to some one of the four operative positions thereof. As will be appreciated from the foregoing description, it is desirable to anticipate voltage changes in the system, particularly with respect to the closing of switch 1, in order to reduce the time needed for effecting regenerative operation, for example, after the operator has moved his master controller to the corresponding position.

The present arrangement of the relay device 30 and the transformer 33 is adapted to require a relatively small transformer capacity. In my co-pending application, Serial No. 190,135, filed September 7, 1917, patented Dec. 14, 1920, No. 1,361,994, a similar voltage-balancing relay is shown in combination with a transformer, which, however, must be of relatively large capacity, since a comparatively high voltage must be induced therein to accomplish the desired effects. In the above-identified application, the secondary winding of the transformer is connected in series relation with the relay armature 31, whereas, in the present instance, the secondary transformer winding is connected in parallel relation to that armature. The arrangement of transformer coils is such that the transformer core is magnetized in the same direction by both of them, whereby, if the main machine voltage is rising, causing an increase in current to traverse the resistor 37 and the primary winding 35 of the transformer 33, such action will induce a voltage in the secondary transformer winding 34 that assists the normal flow of current therein. Consequently, the major portion of the current traversing the resistor 36 is caused to traverse the secondary transformer winding 34, and only a small fraction of that current passes through the relay armature 31. Since the operating voltage of the relay armature, as well as the current, is always of a relatively low value, it follows that the voltage and current of the transformer, and, therefore, the capacity thereof, may be relatively small also.

The relay armature 31 is mechanically connected, by a shaft 38 or otherwise, to a small drum or cylinder 39 which is normally maintained in the illustrated position by means of a plurality of centering springs 79. The purpose of the various contact segments shown will be set forth later in connection with Fig. 9.

The torque-motor limit relay 40 comprises a commutator-type armature 41 that is connected through a secondary winding 45 of the transformer 43 across the main-circuit inductive device 140, while an exciting field winding 42 for the relay has one terminal connected to a point intermediate equal sections 46 and 47 of another secondary winding of the transformer 43, the other terminal of the exciting field winding 42 being connected through a resistor 42$^a$, to the upper end of the main field winding 22.

By reason of the illustrated connections of the relay device 40, changes in the exciter field winding 57 influence both the field current and the armature current of the relay. However, to properly function, the action of the transformer 43 with respect to the field winding 42 for the relay must be reversed when the main machines change from regeneration to motoring, or vice versa. In the present instance, this result is accomplished by connecting one terminal of the field winding 42 to a point intermediate the transformer sections 46 and 47, the outer terminals of which are connected to suitable control fingers that engage a contact segment 49$^a$ of the relay 40 in its deflected positions A′ and R, respectively corresponding to acceleration and regeneration. Consequently, only one of the transformer sections 46 and 47 is actively employed at any time, and the desired reversal of current through the exciting field winding 42 of the relay device is automatically secured in this manner.

The relay device 50 is connected in parallel relation to the main exciting field winding 22, and is employed for the purpose of holding the line switch 1 open until stable conditions are established, when it is desired to connect the machines to the supply circuit. Whenever the excitation of the main exciting field winding 22 is fluctuating, the effective voltage thereof will be sufficient to maintain the relay device 50 in its upper or open-circuit position, as further described in connection with Fig. 9.

The relay device 51 has its actuating coil connected in series relation with the main armature 20 and acts in conjunction with the relay device 40 for the purpose of automatically controlling the operation of the system. Preferably, the solenoid-type current relay 51 is arranged to be active only during the high-speed or parallel connection of the main machines, and it is adapted to prevent operation of the main regulating controller, or the like, whenever the current traversing the main armature 20 exceeds a predetermined value, as subsequently set forth in greater detail.

The relay device 52 measures the voltage of the main machine 18, being connected from the left-hand side of the switch 1 through the exciting field winding 32 for the torque relay 30 to the negative supply-circuit conductor, Ground. The relay device 52' is adapted to govern certain circuits, to be described later, under low-voltage conditions of the supply circuit.

Figure 9:
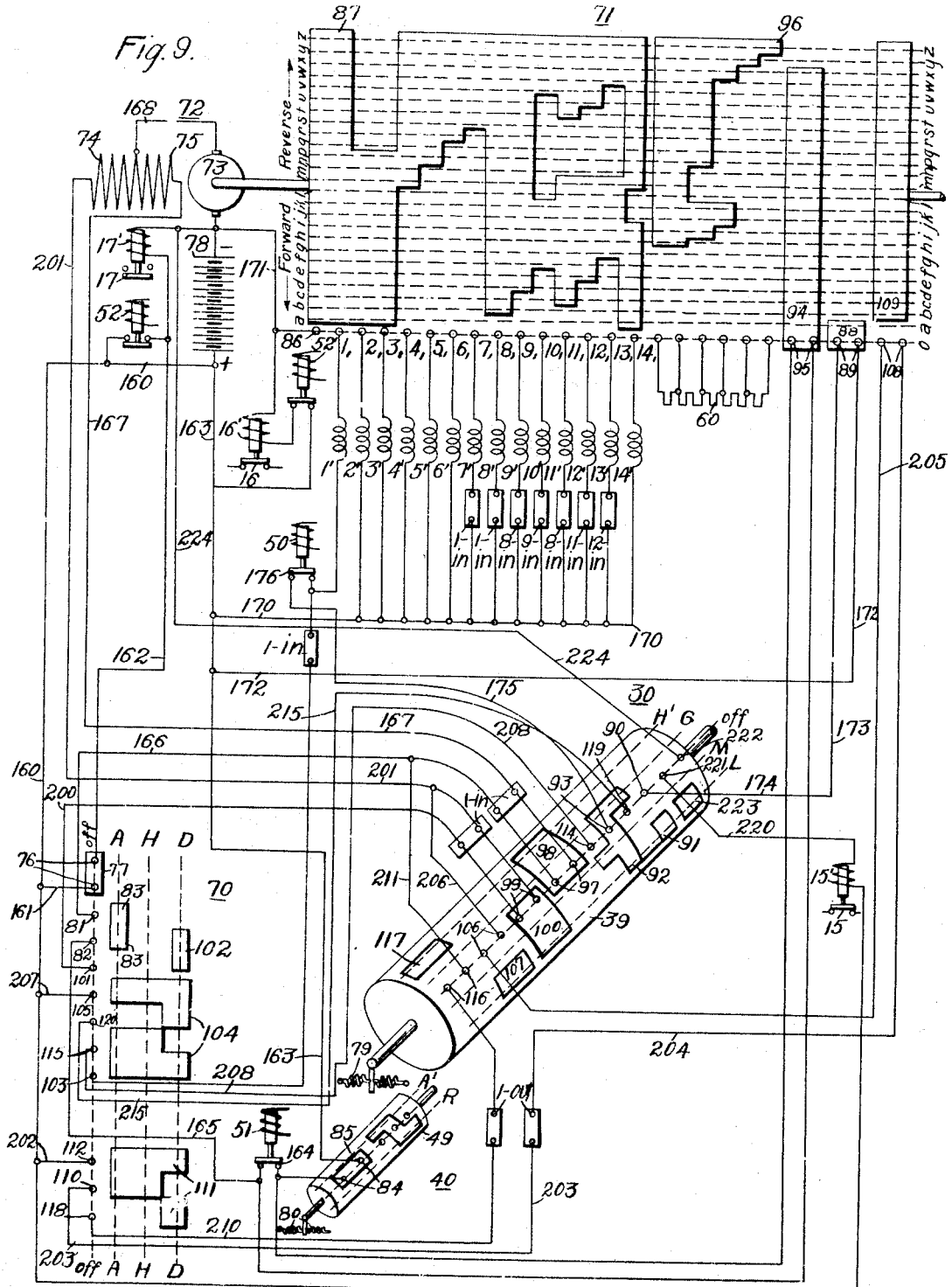
Fig. 9 is a diagrammatic view of the auxiliary control circuits for governing the various switching devices that are shown in Fig. 8.
Figure 10:
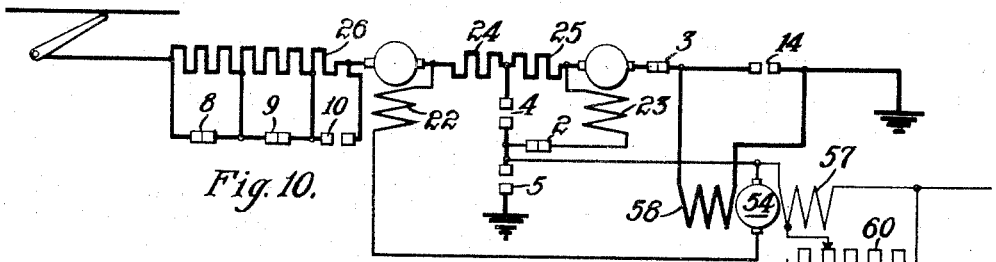
Figure 11:
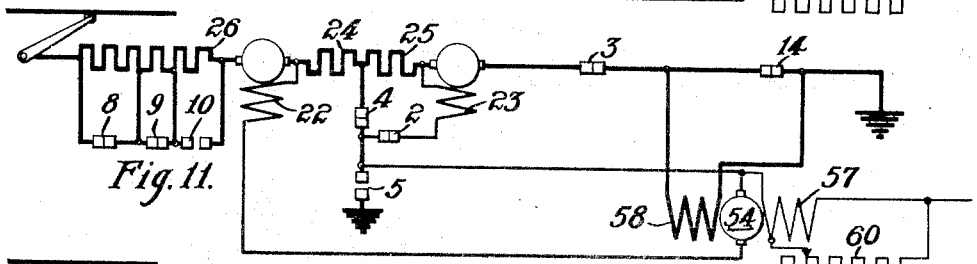
Figure 12:
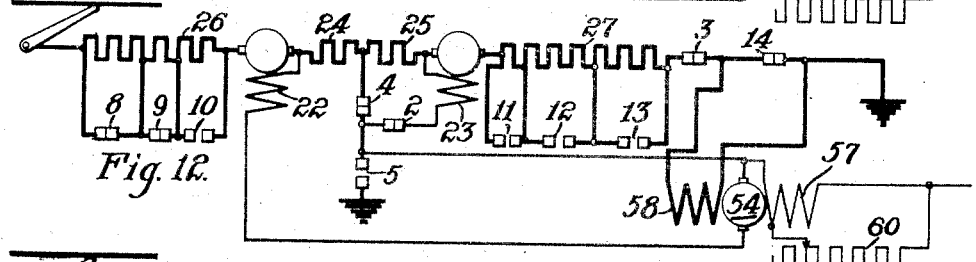
Figure 13:
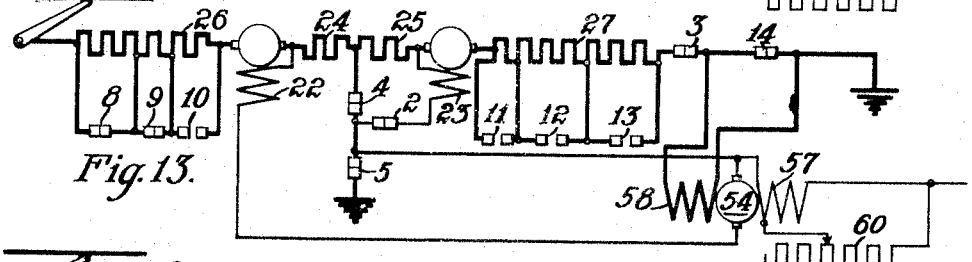
Figure 14:
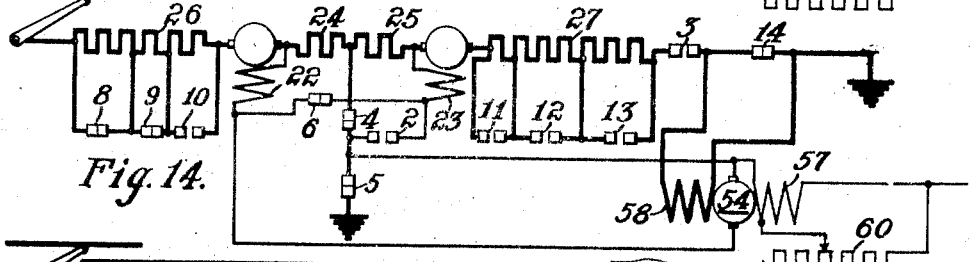
Figure 15:
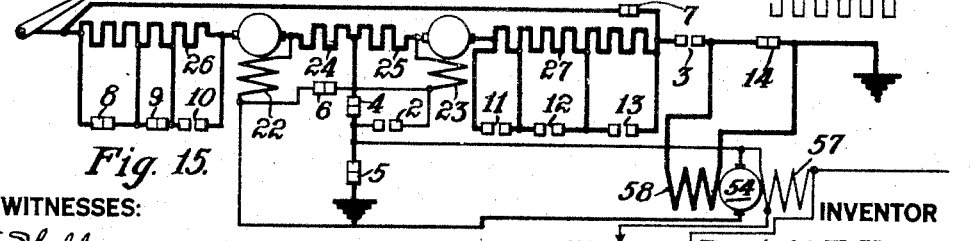

Referring to Fig. 9, the auxiliary system shown comprises a master controller 70 having a plurality of operative positions, A, H and D, respectively, standing for accelerating, holding, and decelerating; and a sequence drum 71 having a plurality of operative positions $a$ to $z$, inclusive, being driven by a pilot motor 72, or the equivalent. The actuating coils for the switches 1 to 14 are designated as 1' to 14', and the corresponding control fingers for the sequence drum 71 are marked $1_1$ to $14_1$. In addition to the various contact members of the torque relay devices 30 and 40, together with the contact disks of the solenoid type relay devices previously mentioned, a plurality of electrical interlocks, of the familiar type shown in connection with the switch 1 in Fig. 8, are employed, energy for the auxiliary controlling circuits being driven from a battery 78, or the like.

The pilot motor 72 comprises a commutator-type armature 73 that is directly connected to the operating shaft of the sequence drum 71, and an exciting field winding having two parts, 74 and 75, which are alternatively energized to produce movement of the armature 73 and of the sequence drum 71 in the one or the other direction. Whenever the field coil 75 is energized, the drum moves forwardly, that is, from the illustrated "off" position marked "$o$" towards the final operative position $z$, whereas, the energization of the other field coil 74 effects a backward movement of the sequence drum.

Assuming that it is desired to effect acceleration of the illustrated main machines from rest, the master controller 70 is actuated to its position A, thereby first interrupting a circuit from the positive terminal of the battery 78 through conductors 160 and 161, control fingers 76, which are bridged by contact segment 77 of the master controller, conductor 162 and actuating coil 17' of the switch 17 to the negative terminal of the battery. Consequently, the switch 17 is closed whenever the master controller occupies its "off" position, to weaken the field winding 57 for the exciter armature 55 to a very great extent. In this way, the heating losses in the exciter, during a coasting or rest period, are reduced to an inconsiderable value.

By actuating the master controller to its position A, therefore, the switch 17 is opened to provide full excitation for the field winding 57 of the exciter, which is thus prepared for supplying the necessary exciting voltage to the main field windings 22 and 23.

As soon as the master controller reaches its position A, another circuit is established from the positive terminal of the battery 78 through conductor 163, control fingers 84, which are bridged by contact segment 85 of the relay device 40 in its normal intermediate position, whence circuit is continued through the contact disk 164 of the current relay 51 in its lower position, conductor 165, control fingers 82 and 81, which are bridged by contact segment 83 of the master controller, conductor 166, control fingers 97, which are bridged by contact segment 98 of the relay device 30 in its normal intermediate position, conductor 167, field coil 75 of the pilot motor 72, conductor 168 and armature 73 to the negative battery terminal. Consequently, the sequence drum 71 is actuated to its initial operative position $a$.

Upon such movement of the sequence drum 71, a further circuit is established from the positively energized conductor 163 through conductor 170, the actuating coils 2', 3' and 14' and corresponding control fingers $2_1$, $3_1$ and $14_1$, whence common circuit is continued through contact segment 87 of the sequence drum, control finger 86 and conductor 171 to the negative battery terminal. Switches 2, 3 and 14 are thus closed directly by the sequence drum.

Switch 1 may also be closed at this time by means of a circuit including conductors 163 and 172, control fingers 89, which are bridged by contact segment 88 of the sequence drum, conductors 173 and 174, control finger 90, contact segments 91 and 92 and control finger 93 of the relay device 30 (which now occupies its extreme position L after the switches 2 and 3 are closed, when the voltage supplied to the relay device armature 31 is relatively high because of the initial low or substantially zero voltage of the main machines), circuit being continued from the control fingers 93 of the relay device 30 through conductor 175, contact disk 176 of the relay 50, provided that this relay occupies its lower position corresponding to stable main field-excitation conditions, circuit being completed through the actuating coil 1', control finger $1_1$ to the contact segment 87 of the sequence drum, and thence to the negative battery terminal, as previously described.

Upon the closure of switch 1, various interlocks 1-in are included in the auxiliary circuits, one such interlock being connected between the actuating coil 1' and control finger 103 which is engaged by contact segment 104 of the master controller, whence circuit is continued through control finger 105 and conductor 160 to the positive battery terminal. In this way, the line switch 1 is held closed, irrespective of the subsequent movement of the excitation relay 50 or of the coasting torque relay 30. Furthermore, an interlock 1-in bridges conductors 166 and 167 to further render the operation of the sequence drum 71 independent of the contact segment 98 of the relay device 30.

The last-mentioned interlock permits further forward movement of the sequence drum, which is held in position $a$ until field-excitation conditions are stable and the switch 1 has closed to cause the drum 39 to return from position L, wherein the pilot motor circuit is interrupted at control fingers 97, to the central position, "off".

Further step-by-step movement of the sequence drum 71 is dependent upon the torque relay device 40, which interrupts the previously traced circuit of the pilot motor 72 whenever the torque of the main machine differs from a predetermined value. The relay device 40 alone governs the action of the pilot motor through positions $a$ to $x$ inclusive of the sequence drum, while the solenoid-type current relay 51 is inoperative to govern the pilot motor during the positions mentioned, since the contact members of the relay 51 are bridged by control fingers 95 and contact segment 94 of the sequence drum. However, in the high-speed parallel positions $y$ and $z$ of the sequence drum, the current relay 51 is made effective for the purpose of preventing undesirably high ratios of armature ampere-turns to field-winding ampere-turns, which ratios are otherwise liable to be set up during the period of weak field-excitation accompanying high-speed operation of the main machine.

Turning temporarily to Fig. 8, the main circuits that are formed by the closure of switches 1, 2, 3 and 14 may be traced as follows: from the trolley through conductors 180 and 182, the inductive device 140, switch 1, the entire accelerating resistor 26, the main armature 20, actuating coil of the current relay 51, the stablizing resistors 24 and 25, main armature 21, the entire accelerating resistor 27, and switches 3 and 14 to the negative conductor Ground.

Another circuit is established from the positive terminal of the exciter armature 55 through conductors 185 and 186, switch 2, conductor 187, main field winding 23, stablizing resistors 25 and 24, main field winding 22 and conductors 183 and 184 to the opposite terminal of the exciter armature.

An auxiliary circuit is established from the trolley through conductors 180, 190 and 191, driving or motor armature 54 for the exciter armature 55 and field winding 56 for the driving armature to junction-point 192, where the circuit divides, one branch including field winding 57 and a second junction-point 193, the other branch traversing variable resistors 60, 61 and 62 and primary winding 44 of the transformer 43 to the junction-point 193, whence a common circuit is continued to ground.

Referring again to Fig. 9, it will be observed that movement of the sequence drum 71 through positions $b$ to $g$, inclusive, energizes the actuating coils 8', 11', 9', 12', 10' and 13' through suitable interlocks in that order, to gradually short-circuit the accelerating resistors 26 and 27 and accelerate the motors to series relation.

In positions $h$ $i$ and $j$, of the sequence drum, portions of the resistor 60 are short-circuited to weaken the field winding 57 for the exciter armature, and thereby correspondingly reduce the excitation of the main field windings 22 and 23, which action, as well known, serves to further increase the operating speed of the main motors.

In position $k$, the other field winding 58 for the exciter armature 55 is rendered active by reason of the de-energization of the actuating coil 14' and the consequent opening of the switch 14, which normally short-circuits the field winding 58. The two field windings 57 and 58 are differentially disposed during acceleration of the main machines for the purpose of flattening the last series characteristic curve thereof, as previously explained in detail.

In position $l$, the actuating coil 10' is de-energized to re-insert a portion of the accelerating resistor 26 in the motor circuit, as an initial transition step. See Fig. 10. In position $m$, the actuating coil 4' is energized, thereby closing the switch 4 and impressing the full exciter voltage across the main field windings 22 and 23 in parallel relation, the stabilizing resistors 24 and 25 being still connected in respective series relation with the field windings. The closure of the switch 4 causes the main armature 20 to absorb the major portion of the operating voltage, while the other main armature 21 is energized to a relatively slight degree, since the load current for the most part traverses the stabilizing resistor 25 and only a relatively small portion thereof passes through the field winding 23, which is connected in a local shunting circuit including switches 2 and 4 and the resistor 25. See Fig. 11.

During the transitional movement through positions $l$ and $m$, a portion of the resistor 60 is again inserted in circuit to correspondingly strengthen the field winding 57 for the exciter armature 55, while the differential field winding 58 is again short-circuited in position $m$ by the closure of the switch 14. In this way, the exciter voltage is increased in preparation for the initial parallel connection of the main motors. See Fig. 11.

In position $n$, switches 11, 12 and 13 are opened to re-introduce the resistor 27 in circuit with the main armature 21. See Fig. 12.

In position $p$, the switch 5 is closed, whereby the main motor 19 is included in a local or shunting circuit that comprises the armature 21, stabilizing resistor 25, switches 4 and 5, ground, switches 14 and 3, and resistor 27. The field winding 23 is also shunted by a circuit comprising stabilizing resistor 25 and switches 4 and 2, as mentioned above. At the same time, a portion of the resistor 60 is short-circuited to slightly reduce the excitation of the field winding 57 for the exciter armature 55, the value of such excitation being the maximum that is employed during the greater portion of parallel machine operation. See Fig. 13.

In position $q$, switches 2 and 3 are opened, while in position $r$ switch 6 is closed, thereby establishing parallel connections for the main field windings. See Fig. 14.

In position $s$, the switch 7 is also closed, which completes the parallel connection of the main armatures. See Fig. 15.

One novel feature of the transition just described is the annulment of the excitation of the shunted machine, in spite of the separate excitation thereof, thus affording the advantages of the well-known "shunting" transition of straight series motors. With prior systems embodying separate excitation, the residual field magnetism has set up undesirable currents in the shunted armature.

Referring temporarily to Fig. 8, the parallel connections just recited may be traced as follows: from the trolley through conductors 180 and 182, inductive device 140, switch 1, a portion of the accelerating resistor 26, main armature 20, actuating coil of the current relay 51, stabilizing resistor 24, and switches 4 and 5 to ground. The circuit for the other main armature is continued from conductor 180 through conductor 190, switch 7, the entire accelerating resistor 27, main armature 21 and stabilizing resistor 25 to the switches 4 and 5.

In positions $t$ to $w$, inclusive, of the sequence drum, the remaining resistor short-circuiting switches 10 to 13, inclusive, are successively closed to further increase the speed of the main motors, while in positions $x$, $y$ and $z$, the remaining sections of the resistor 60 are cut out to reduce the excitation of the field winding 57 for the exciter armature 55.

If, at any time, it is desired to maintain the vehicle speed at a value corresponding to any given notch of the sequence drum, the master controller 70 may be actuated to its position H as soon as the sequence drum occupies the desired position. Such action completely de-energizes the pilot motor 72, by reason of the disengagement of the contact segment 83 from control fingers 81 and 82.

Assuming that regenerative operation is desired after the main machines have attained their full-speed relation, or any other suitable stage, the master controller may be moved to its position D, whereby a circuit is established from the positive terminal of the battery 78 through conductor 163, contact members 84 and 85 of the torque limit relay 40 in its normal intermediate position, the contact disk 164 of the solenoid-type limit switch 51, conductor 165, control fingers 82 and 101, which are bridged by contact segment 102 of the master controller in position D, conductor 200, contact members 99 and 100 of the relay device 30, conductor 201, field coil 74 of the pilot motor, and thence through conductor 168 and armature 73 to the negative battery terminal. Consequently, the sequence drum 71 is moved backwardly through its successive positions under the control of the torque limit relay 40, and also the current relay 51 in positions $z$ and $y$, in accordance with previously described principles.

Whenever coasting operation is desired, the master controller is moved to its "off" position, whereby the circuit of the actuating coil for switch 1 is opened directly and switches 7 to 13, inclusive, are likewise opened by reason of the exclusion of the various illustrated interlocks from the circuits of the respective actuating coils.

The chief function of the relay device 30 is the automatic regulation of the system at the termination of a period of coasting, as previously mentioned. For example, if acceleration of the main motors is desired after coasting period, the master controller is again moved to its position A. The relay drum 39 then assumes some position that is dependent upon the vehicle speed and also upon the position that the sequence drum 71 occupies at the time.

If the relay drum 39 moves to its position L while the sequence drum 71 is in its position $o$ or $a$, the previously described accelerating operation is effected. However, if the drum 71 occupies any other position, the contact members 88 and 89 thereof are ineffective to complete the circuit of the line switch 1. Under such conditions, a circuit is established from the positively energized conductor 160 through conductor 202, control fingers 112 and 110, which are bridged by contact segment 111 of the master controller, conductor 203, interlock 1-out, conductor 204, control fingers 108, which are bridged by contact segment 109 of the sequence drum, conductor 205, control fingers 106, which are bridged by contact segment 107 of the relay drum 39 in its position L, conductors 206 and 201, and thence, through the field coil 74 and the armature 73 of the pilot motor, to the negative battery terminal. Consequently, the sequence drum 71 is moved backwardly until either the relay drum 39 moves out of its position L or until the sequence drum 71 has returned to its position $a$. In the latter case, the circuit of the pilot motor, as just traced, is broken by the disengagement of contact segment 109 from control fingers 108 of the sequence drum, whereupon the switch 1 is closed, as initially described above.

If the relay drum 39 occupies its position M, the line switch 1 is closed, provided the excitation relay 50 occupies its lower position corresponding to stable conditions, through a circuit that is established from conductor 160 through conductor 207, control fingers 105 and 115, which are bridged by contact segment 104 of the master controller, conductor 208, control fingers 114 and 93, which are bridged by contact segment 92 of the relay drum 39 in its position M, and thence through conductor 175, the contact disk 176 of the excitation relay 50 and the actuating coil 1' of the switch 1, as previously traced.

If the relay drum 39 occupies any one of its positions H', G, or "off," the line switch 1 cannot be closed, by reason of the interruption of its actuating-coil circuit, but a new circuit is established from the positively energized conductor 163 through contact members 84 and 85 of the torque limit relay 40 and contact disk 164 of the current relay 51, whence circuit is continued through conductor 165, control fingers 82 and 81, which are bridged by contact segment 83 of the master controller, conductor 166, contact members 97 and 98 of the relay drum 39, in any one of the positions "off," G, or H' of the drum, conductor 167 and field coil 75 of the pilot motor. Consequently, the sequence drum 71 is moved in a forward direction to reduce the main machine voltage until the relay drum 39 moves to its position M, when the line switch 1 may be closed, as previously described.

Assuming that regenerative operation is desired after a coasting period, the master controller 70 is actuated to its position D. Again the relay 39 may then occupy any one of its five positions.

If the relay is actuated to its position H', the line switch 1 cannot be closed, but a new circuit is established from conductor 160 through conductor 202, control fingers 112 and 118, which are bridged by contact segment 111 of the master controller, conductor 210, interlock 1-out, control fingers 116, which are bridged by contact segment 117 of the relay drum in its position H', and conductor 211 to the conductor 166, when circuit is completed through the pilot motor field coil 75, as previously traced. The sequence drum 71 is thus moved in a forward direction until the main-machine voltage is low enough to cause the torque relay 30 to assume its position G. Under such conditions, the line switch 1 may be closed through a circuit including conductors 160 and 207, control fingers 105 and 120, which are bridged by contact segment 104 of the master controller, conductor 215, control fingers 119 and 93 of the relay drum 39 in its position G, whence circuit is completed through the conductor 175 and the actuating coil 1' of the switch 1, as hereinbefore described.

If the relay drum 39 occupies any one of its positions "off," M or L, the line switch 1 cannot be closed, but a circuit is established through contact members 85 and 84 of the torque limit relay 40, contact members 82, 101, and 102 of the master controller, and contact members 99 and 100 of the relay drum 39, in accordance with the previously traced circuit, to the field coil 74 for the pilot motor, whereby the sequence drum 71 is moved backwardly until the main machine voltage is increased sufficiently to cause the torque relay 30 to assume its position G, wherein the line switch 1 may be closed, as previously described.

It should be further noted that at any time when the torque relay 30 occupies its position L, that is, whenever the main machine voltage is relatively low, the switch 15 is raised to its upper or circuit-opening position by means of a circuit including conductor 160, actuating coil 15' of the switch 15, conductor 220, control fingers 221 and 222, which are bridged by contact segment 223, and thence, through conductor 224, to the negative battery terminal.

In this way, the switch 15 is opened to insert the resistor 62, in the circuit shunting the exciting field winding 57 for the generator armature 55, thereby quickly increasing the main-machine voltage.

On the other hand, when the main-machine voltage is relatively high during the coasting period, the relay device 52 will be lifted to its circuit-closing position to complete a circuit including the actuating coil 17' of the switch 17 and the contact members of the relay 52. By thus shunting the exciting field winding 57 for the exciter with the resistor 63, which has relatively low resistance value, the excitation of the generator armature 55, and, therefore, of the main exciting field windings, is quickly reduced. The relay 52 is also adapted to provide protection for the system in the event of relatively high main-machine voltages that are caused by the interruption of the supply-circuit voltage, by reason of the trolley-pole leaving the wire, for example.

In the case of a relatively low line voltage, the relay 52', which is connected directly across the supply circuit, drops to its lower circuit-closing position to directly connect the actuating coil 16' of the switch 16 across the terminals of the battery 78. In this way, the switch 16 is opened to insert the resistor 61 in the circuit that shunts the exciting field winding 57 for the generator armature 55, whereby the excitation of the accelerating generator is increased sufficiently to compensate for the relatively low line voltage by insuring that a main exciting field flux is provided that is strong enough to produce satisfactory starting conditions of the main machine.

The detailed action of the torque relay 40 in conjunction with the transformer 43, may be explained as follows:

If a part of the resistor 60 is short-circuited by the sequence drum 71, the current flowing through the resistor and the primary winding 44 increases, while that in the field winding 57 decreases, which indirectly weakens the main-machine field flux and increases the main current during motoring. The increase of current in the primary winding 44 increases the transformer magnetic field, thereby inducing a voltage in the secondary winding 45 which assists in deflecting the relay armature 41 in the same direction in which it is deflected by a motoring current in the main-circuit inductive device 140. Assuming further that the relay drum 49 occupies the A' position during motoring, the secondary transformer coil 47 is connected in series relation with the relay field winding 42. The increasing flux of the transformer 43 also induces a voltage in the secondary coil 47 which increases the total voltage of the field winding 42, thereby further assisting in deflecting the relay.

If, during regeneration, a part of the resistor 60 is introduced into circuit, the current in the resistor and the primary transformer winding 44 decreases, while that in the field winding 57 increases, thereby strengthening the main field flux and the regenerative current. The decrease of current in the primary winding 44 decreases the magnetic field of the transformer 43 and induces in the secondary winding 45 a voltage opposite to that mentioned above in connection with acceleration. The current in, and the voltage across, the main-circuit inductive device 140 are, however, also reversed, so that the two voltages in question again add and thus cause a quick deflection of the relay, but this time in the regenerative direction. With the relay in regenerative position R, the secondary transformer coil 46 is connected in circuit. While the voltage in the coil 46 is also reversed, its turns are connected in circuit in a reversed direction from those of the coil 47. Thus the effect of the coil 46 during regeneration is the same as that of the coil 47 during motoring, viz, the voltage across the relay field winding is again increased, thereby assisting the deflection of the relay.

I do not wish to be restricted to the specific circuit connections or arrangement of parts herein set forth, as various modifications thereof may be made without departing from the spirit and scope of my invention. I desire, therefore, that only such limitations shall be imposed thereupon as are indicated in the appended claims.

I claim as my invention:

1. In a system of control, the combination with a dynamo-electric machine having an armature and field-exciting means, of a relay device for governing the automatic operation of said machine, and means for influencing said relay device by transient transformer action in a circuit of said exciting means.

2. In a system of control, the combination with an electric motor having an armature and a field winding, of a relay device of the motor type for governing the operation of said motor, and means for connecting the windings of said relay in circuit to produce a smaller time-element for said relay than for the motor.

3. In a system of control, the combination with an electric motor having an armature and a field winding, of an impedance connected in the armature circuit, a resistor, and a relay device of the motor type for governing the motor operation and having its co-operating windings respectively connected in circuit with said impedance and in series relation with said resistor and in circuit with said field winding.

4. In a system of control, the combination with an electric motor having an armature and field-exciting means, of an impedance connected in the armature circuit, a plural-coil transformer having one coil connected in a circuit including said field-exciting means, and a relay device of the motor type for governing the motor operation and having its co-operating windings respectively connected in circuit with another transformer coil across said impedance and connected across said field winding.

5. In a system of control, the combination with an electric motor having an armature and a field winding, of an inductive device connected in the armature circuit, a transformer having a plurality of coils, a resistor, and a relay device of the motor type for governing the motor operation and having its co-operating windings respectively connected through one of the transformer coils across said inductive device and connected through said resistor and another transformer coil across said field winding.

6. In a system of control, the combination with a supply circuit and a dynamo-electric machine having an armature and a field winding, of a resistor connected in series relation with said armature across said supply circuit, an armature for exciting said field winding through said resistor, a relay device for governing the automatic operation of said machine, and means for rendering said relay device responsive to transient voltage conditions in said field winding.

7. In a system of control, the combination with a supply circuit and a dynamo-electric machine having an armature and a field winding, of a resistor connected in series relation with said armature across said supply circuit, an armature for exciting said field winding through said resistor, a relay device for governing the automatic operation of said machine, and means for connecting the windings of said relay in circuit to produce a smaller time-element of response than for the windings of said motor.

8. In a system of control, the combination with a dynamo-electric machine having an armature and a field winding, of an inductive device connected in the armature circuit, an armature for exciting said field winding, a field coil for said exciting armature, a transformer having one coil in circuit with said field coil, and a relay device for governing the machine operation and having one winding connected in circuit with another transformer coil across said inductive device and having another co-operating winding connected in circuit with different sections of a third transformer winding in accordance with the position of the relay device.

9. In a system of control, the combination with a dynamo-electric machine having an armature and a field winding, of an inductive device connected in the armature circuit, an armature for exciting said field winding, a field coil for said exciting armature, a transformer having one coil in circuit with said field coil, a motor-type relay device for governing the machine operation and having an armature connected in circuit with another transformer coil across said inductive device and provided with a field winding having its terminals respectively connected to the machine field winding and to an intermediate point of a third transformer winding, and a contact member actuated by the relay device for connecting the one or the other portion of said third transformer winding in circuit with the two field windings.

10. The combination with a supply circuit and a dynamo-electric machine having an armature and a field winding, of means for separately exciting said field winding, a controller having positions respectively corresponding to acceleration and deceleration of said machine, and a motor-type relay device having control means effecting the connection of the machine to the supply circuit when the controller occupies an accelerating position and the supply circuit voltage is higher than the machine voltage, and for effecting such connection when the controller occupies a decelerating position and the supply-circuit voltage is lower than the machine voltage.

11. The combination with a supply circuit and a dynamo-electric machine having an armature and a field winding, of a switch for connecting the machine to the supply circuit, a relay device for governing certain motor connections and having its co-operating windings respectively connected across said switch and across the supply circuit, and a transformer having its windings respectively connected in parallel relation to one of the relay windings and across the supply circuit.

12. In a system of control, the combination with a supply circuit and a plurality of dynamo-electric machines severally having armatures and field windings, of means for separately exciting said field windings, and means for effecting transition of the machines from series to parallel relation comprising means for impressing a relatively high exciting voltage upon one field winding and substantially nullifying the effect of the field winding of another machine, means for closing a local circuit around that machine, means for connecting the field windings in local parallel relation, and means for connecting the armatures in parallel relation across the supply circuit.

13. The method of effecting transition of a plurality of separately excited dynamo-electric machines from series to parallel relation which consists in impressing an increased exciting voltage upon one field winding and substantially nullifying the effect of the field winding of another machine, closing a local circuit around that machine, and connecting the field windings and then the armatures in parallel relation.

14. The method of effecting series-parallel transition of a plurality of separately excited motors which consists in substantially nullifying the effect of the field winding of one machine, closing a local resistance circuit around that machine, connecting the field windings in local parallel relation, and connecting the armatures in parallel relation.

15. The method of effecting transition of a plurality of separately excited dynamo-electric machines from series to parallel relation which consists in impressing an increased exciting voltage upon one field winding and substantially nullifying the effect of the field winding of another machine, further strengthening the exciting voltage, closing a local resistance circuit around the last-named machine, reducing the exciting voltage, connecting the field windings in local parallel relation, and connecting the armatures in parallel operating relation.

16. In a system of control, the combination with a dynamo-electric machine having field-exciting means, of means for governing the operation of said machine, and means for influencing said governing means by transient transformer action in a circuit of said exciting means.

17. In a system of control, the combination with a supply circuit and a dynamo-electric machine having an armature and a field winding, of a translating device connected in series relation with said armature across said supply circuit, means for exciting said field winding through said device, means for governing the operation of said machine, and means for rendering said governing means responsive to transient electrical conditions in said field winding.

In testimony whereof, I have hereunto subscribed my name this 24th day of April, 1919.

RUDOLF E. HELLMUND.